United States Patent [19]

Bauer et al.

[11] 4,145,919
[45] Mar. 27, 1979

[54] METHOD FOR THE DETERMINATION OF THE STATIC AXIAL THRUST OF ROLLER BEARINGS

[75] Inventors: Heinrich F. Bauer, Eichenau; Florian Hildebrandt, Günding; Gerhard Helbling, Munich, all of Fed. Rep. of Germany

[73] Assignee: Motoren- und Turbiene-Union Munchen GmbH, Munich, Fed. Rep. of Germany

[21] Appl. No.: 841,661

[22] Filed: Oct. 13, 1977

[30] Foreign Application Priority Data

Oct. 21, 1976 [DE] Fed. Rep. of Germany ........ 2647440

[51] Int. Cl.² .................................................. G01L 5/12
[52] U.S. Cl. ......................................................... 73/140
[58] Field of Search ............................................ 73/140

[56] References Cited

U.S. PATENT DOCUMENTS 2,367,017  1/1945  Gardiner ................................ 73/140

FOREIGN PATENT DOCUMENTS 790057  2/1958  United Kingdom ...................... 73/140

Primary Examiner—Anthony V. Ciarlante
Attorney, Agent, or Firm—Scully, Scott, Murphy & Presser

[57] ABSTRACT

A method for the determination of the static axial thrust of roller bearings under extreme operating conditions, which includes determining the amplitude of the dynamic deflection in an axial direction at an artificially produced weak point in a stationary bearing component, and employing the obtained value as a measure for calculating the axial thrust. The method employs sensors, such as strain gauge strips, applied to a stationary portion of the bearing to obtain the dynamic deflection of the bearing weak point.

2 Claims, 4 Drawing Figures

VIEW A

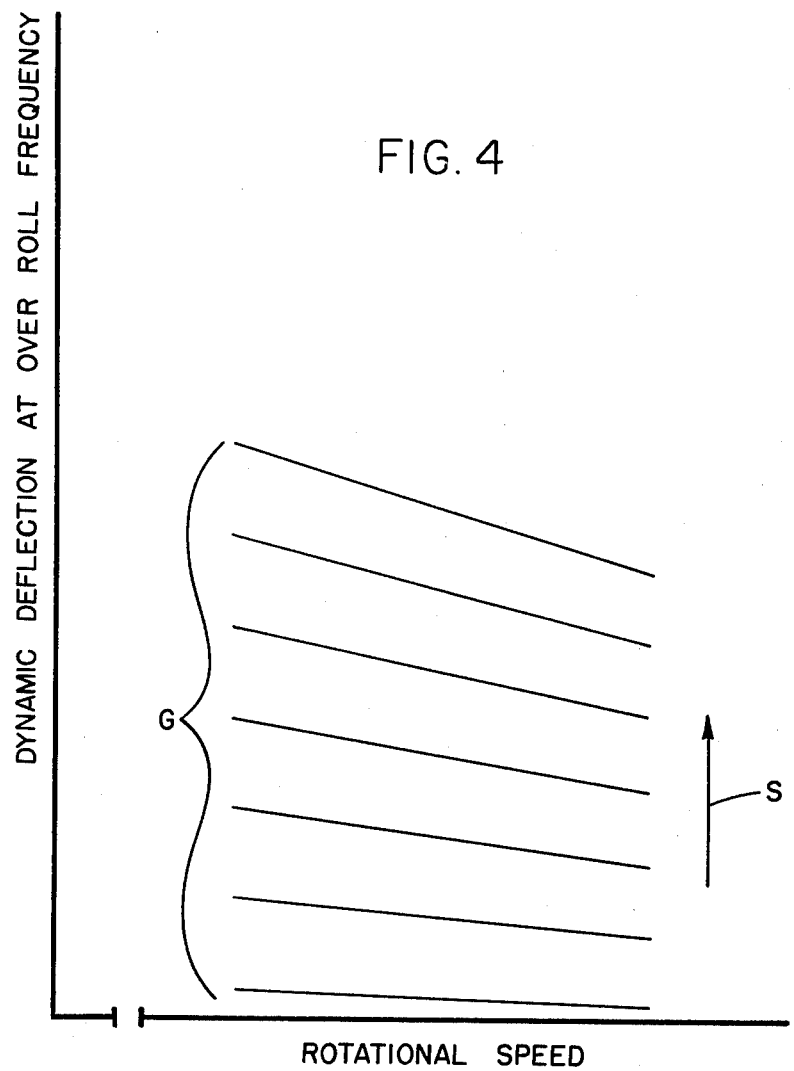

METHOD FOR THE DETERMINATION OF THE STATIC AXIAL THRUST OF ROLLER BEARINGS

BACKGROUND OF THE INVENTION

1. Field of the Invention

The present invention relates to a method for the determination of the static axial thrust of ball or roller bearings under extreme operating conditions.

2. Discussion of the Prior Art

Currently known methods for the measurement of the axial displacement may be divided into two groups:

1. Measuring methods in which the sensors are applied on the rotating shaft. These require a free shaft end for attachment of the rotation transmitter and are generally quite limited in running time and maximum rotational speed. The signals of the sensors, almost always, consist of a mixture of axial thrust or displacement, torsional moment and deflection, which must then be separated by means of special circuits or during the evaluation thereof.

2. Measuring methods in which an elastic intermediate element which is equipped with sensors is located between the outer bearing housing and the supporting structure. The measuring element, most frequently a plate spring-shaped or shaft ring-type intermediate member, requires a predetermined extent of axial displacement for the bearing housing for measurement take-off and, as in the case of presently marketed measuring support discs, requires a relatively large amount of additional space. Distinct hysteresis appearances are, in general, connected with the displacement of the outer housing.

SUMMARY OF THE INVENTION

Accordingly, it is an object of the present invention to avoid the disadvantages encountered in presently known methods and, even under difficult operating conditions, for instance at high operating temperatures and limited spatial relationships, to be able to determine axial thrusts with the utilization of conventional sensors.

In order to attain the foregoing object, in accordance with the invention there is to be determined the amplitude of the dynamic deflection in the axial direction at an artificially produced weak point in the stationary bearing component upon over-roll of the roll bodies through the intermediary of suitable sensors, preferably strain gauge strips, whereby the measured value obtained from a few revolutions or circumferential passes of the roll bodies or bearing cage represents a measure for the axial thrust.

This method is particularly well suited for lower and average rotational speeds at high operating temperatures and under limited spatial relationships.

In the interest of obtaining a satisfactory measured result, it is a further basic prerequisite for the practicability of the inventive method that the impulse frequency of the over-roll of the roll bodies does not come to lie in proximity to natural frequencies of the bearing or components thereof, with the attendant resonance rise appearances which would directly result therefrom.

The formulation of the median value for the amplitudes over a plurality of revolutions or roll body passes as a measure for the axial thrust, which is contemplated by the inventive method, with due consideration to an occasional responsive reaction to measurement deviations and tolerances of the bearing, or respectively in the bearing, is advantageous and expedient.

Advantageously, the inventive method is, furthermore, extensively independent of zero point offset and drift occurrences encountered in the measuring installation.

BRIEF DESCRIPTION OF THE DRAWINGS

The invention is now described in detail hereinbelow, taken in conjunction with the accompanying drawings; in which:

FIG. 4 shows a further graph in which the measured results are illustrated in greater detail.

DETAILED DESCRIPTION

Figure 1:
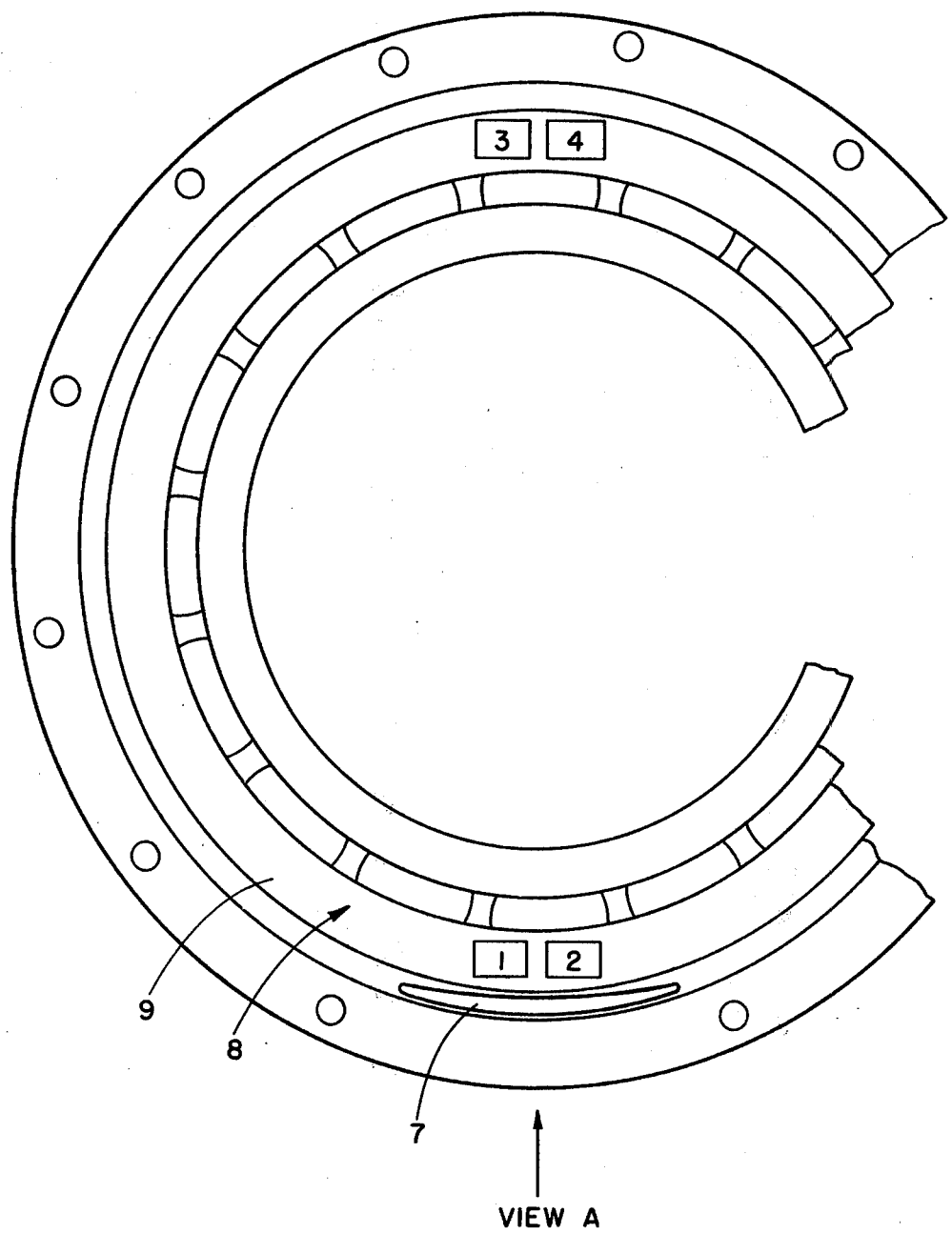
FIG. 1 shows a front view of a roller bearing constructed in a cup shape, which illustrates the position of the strain gauge strips and the position of the onesided recess provided in the support sleeve.
Figure 2:
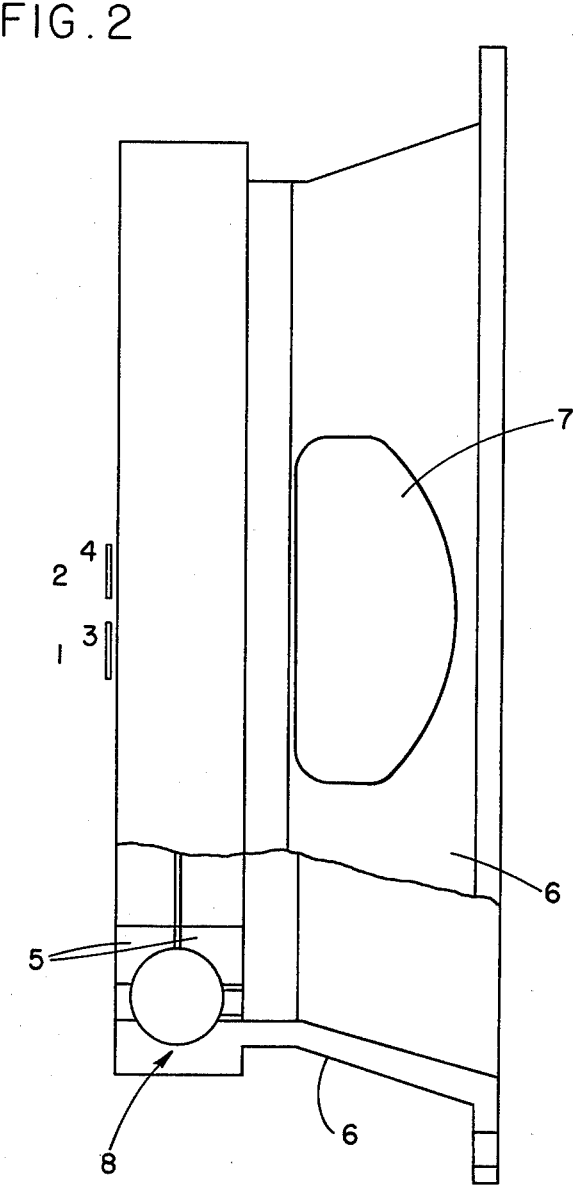
FIG. 2 shows the roller bearing construction, partly in section, in the direction of view A in FIG. 1.

FIGS. 1 and 2 of the drawings illustrate a roller bearing adapted for carrying out of the invention, including a divided inner race 5 a flange-mountable, cup-shaped support member or cone 6 containing the outer bearing ring 8, and balls or rollers 10. The weak point is formed by a cutout 7 in one side of the support member 6.

Figure 3:
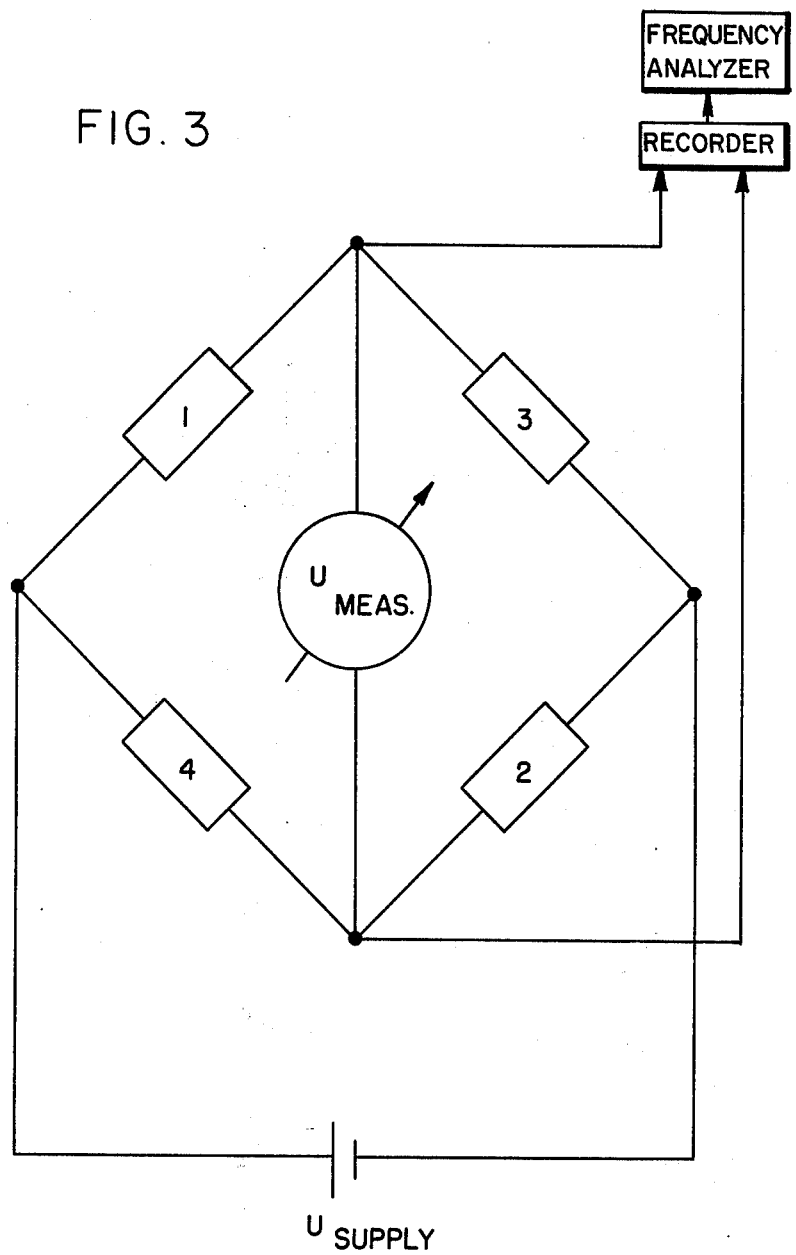
FIG. 3 shows a full bridge circuit associated with the roller bearing of FIGS. 1 and 2.

In order to be able to determine the dynamic deflection at the artificially produced weak point (cutout 7) in the stationary bearing component (support member 6) in the axial direction during the roll bodies over-roll of the cutout 7, the roller bearing of FIGS. 1 and 2 has associated therewith, for example, a strain gauge strip-electrical full bridge having a high temperature resistance, as shown in FIG. 3, whose active sensors 1, 2 mounted on the end surface (front end surface 9 in FIG. 1) on the median diameter of the outer bearing ring 8, in the circumferential direction median of the cutout 7, and precisely oppositely thereof there are mounted the compensating strips 3, 4, considering an even number of roll bodies, on the median diameter of the outer bearing ring 8.

For an odd number of roll bodies, respectively, ball bearings, the compensating strips are displaced by a one-half ball spacing.

In lieu of the full-bridge circuit for the active sensors, respectively compensating strips selected in accordance with the embodiment of FIG. 3, it is contemplatable that the sensors can be arranged in quarter- or half-bridge circuits.

The wideband recorded measuring signal of the strain gauge strip-full bridge is subjected to a frequency analysis for determination of the static axial thrust, and best so in a real time analyzer. Determined hereby is the amplitude of the over-roll frequency of the roll bodies. The result is illustrated in the graph according to FIG. 4.

According to this graph, the axial thrust (increasing axial thrust S) produces a somewhat linearly increasing deflection amplitude which is expressed by the family of linear curves G for different axial thrusts. Superimposed on these is a reduction in deflection with increasing rotational speeds. From the foregoing, it becomes quite clear that, with increasing centrifugal force of the roll bodies, the circumferential tension in the outer bearing ring will increase. This inhibits the dynamic deflection and, consequently, strengthens the weak point.

What is claimed is:

1. In a method for the determination of the static axial thrust of roller bearings under extreme operating conditions, the improvement comprising: determining the amplitude of the dynamic deflection in an axial direction at an artificially produced weak point in the stationary bearing component during overroll thereof by roll bodies of said bearing through the intermediary of sensors producing a measured signal, whereby the obtained measured value from a few measured revolutions of the bearing cage represents a measure for the axial thrust, and subjecting the measured signal to a frequency analysis to determine static axial thrust.

2. A method as claimed in claim 1, said sensors comprising strain gauge strips.

* * * * *